US008205252B2

(12) United States Patent
Simon et al.

(10) Patent No.: US 8,205,252 B2
(45) Date of Patent: Jun. 19, 2012

(54) NETWORK ACCOUNTABILITY AMONG AUTONOMOUS SYSTEMS

(75) Inventors: Daniel R. Simon, Redmond, WA (US); Sharad Agarwal, Seattle, WA (US); David A. Maltz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1724 days.

(21) Appl. No.: 11/460,929

(22) Filed: Jul. 28, 2006

(65) Prior Publication Data

US 2008/0027942 A1    Jan. 31, 2008

(51) Int. Cl.
    *H04L 29/06*    (2006.01)
(52) U.S. Cl. .......... 726/13; 713/160; 713/168; 709/225; 709/236; 380/261
(58) Field of Classification Search .................. 709/225, 709/236; 726/13; 380/261; 713/160, 168
    See application file for complete search history.

(56) References Cited

U.S. PATENT DOCUMENTS

| 6,230,271 | B1 * | 5/2001 | Wadlow et al. ................ 726/1 |
| 6,424,624 | B1 * | 7/2002 | Galand et al. ................ 370/231 |
| 6,658,565 | B1 * | 12/2003 | Gupta et al. ................ 713/153 |
| 6,738,814 | B1 | 5/2004 | Cox et al. |
| 6,880,090 | B1 | 4/2005 | Shawcross |
| 7,007,169 | B2 | 2/2006 | Lingafelt et al. |
| 7,028,179 | B2 | 4/2006 | Anderson et al. |
| 7,167,922 | B2 * | 1/2007 | Narayanan ................ 709/242 |
| 7,369,498 | B1 * | 5/2008 | Ma et al. ................ 370/235 |
| 7,475,424 | B2 * | 1/2009 | Lingafelt et al. ................ 726/13 |
| 7,490,351 | B1 * | 2/2009 | Caves et al. ................ 726/13 |
| 2002/0035683 | A1 | 3/2002 | Kaashoek et al. |
| 2002/0083175 | A1 * | 6/2002 | Afek et al. ................ 709/225 |
| 2003/0035370 | A1 | 2/2003 | Brustoloni |
| 2003/0036970 | A1 | 2/2003 | Brustoloni |
| 2003/0236999 | A1 | 12/2003 | Brustoloni |
| 2004/0032826 | A1 * | 2/2004 | Sridhar ................ 370/222 |
| 2004/0146006 | A1 * | 7/2004 | Jackson ................ 370/230 |

(Continued)

FOREIGN PATENT DOCUMENTS

WO    WO2004070535    8/2004

OTHER PUBLICATIONS

Bellovin, S. "The Security Flag in the IPv4 Header" AT&T Labs Research: (Apr. 1, 2003).*

(Continued)

*Primary Examiner* — Edan Orgad
*Assistant Examiner* — Kari Schmidt
(74) *Attorney, Agent, or Firm* — Lee & Hayes, PLLC

(57) ABSTRACT

Accountability among Autonomous Systems (ASs) in a network ensures reliable identification of various customers within the ASs and provides defensibility against malicious customers within the ASs. In one implementation, reliable identification is achieved by implementing ingress filtering on data packets originating within individual ASs and defensibility is provided by filtering data packets on request. To facilitate on-request filtering, individual ASs are equipped with a Filter Request Server (FRS) to filter data packets from certain customers identified in a filter request. Thus, when a requesting customer makes a filter request against an offending customer, the FRS within the AS to which the offending customer belongs conducts on-request filtering and installs an on-request filter on a first-hop network infrastructure device for the offending customer. Consequently, the first-hop network infrastructure device filters any data packet sent from the offending customer to the requesting customer.

20 Claims, 8 Drawing Sheets

U.S. PATENT DOCUMENTS

2004/0250158 A1 12/2004 Le Pennec et al.
2005/0177717 A1 8/2005 Grosse
2006/0075484 A1* 4/2006 Yang ............................. 726/15
2009/0144820 A1* 6/2009 Kurapati et al. ............... 726/22

OTHER PUBLICATIONS

Simon et al. The "Evil Bit" Revisited: Blocking DDoS Attacks with AS-based Accountability. Microsoft Technical Report: Oct. 2006.*

Maltz et al. Blocking DDoS Attacks with AS-Based Accountability. Microsoft Technical Report: Oct. 2006.*

Cearns, "Design of an Autonomous Anti-DDOS Network (A2D2)", Universtiy of Colorado, Department of Computer Science, Thesis, 2002, 157 pages.

Crocker, S.D., "Protecting the Internet for Distributed Denial-of-Service Attacks: a Proposal", Proceedings of the IEEE, vol. 92, Issue 9, Sep. 2004, pp. 1375-1381.

Houle, et al., "Trends in Denial of Service Attack Technology", CERT Coordination Center, v1.0, Oct. 2001, 21 pages.

Park, et al., "On the Effectiveness of Route-eased Packet Filtering for Distributed DoS Attack Prevention in Power-Law Internets", SIGCOMM '01, ACM, 2001, 12 pages.

Raghavan, et al., "A System for Authenticated Policy-Compliant Routing", SIGCOMM '04, ACM, Session 5: Secure Networks, pp. 167-176.

* cited by examiner

NETWORK ACCOUNTABILITY AMONG AUTONOMOUS SYSTEMS

BACKGROUND

The Internet has been widely accepted as a useful source of information and means for communication. However, the openness and flexibility of the Internet has fostered undesirable activities such as Denial-of-Service (DoS) attacks, Distributed DoS (DDoS) attacks, Internet Protocol (IP) address spoofing, unsolicited commercial email (spam), and malicious traffic sent with harmful intent. One of the most fundamental of such undesirable activities is DoS, in which the network layer of the Open Systems Interconnection (OSI) model is affected. In a DoS attack, malicious traffic is directed toward a targeted system in the network. The targeted system has to expend some or all of its available resources (memory, bandwidth, time, etc.) to provide services to the malicious traffic. This results in the targeted system being unable to provide services to the more desirable data traffic due to scarcity of resources.

Various solutions have been proposed to reduce DoS attacks in a network. These solutions can be categorized into two broad categories, namely, end host-based and router-based.

Conventional end host-based solutions involve recognizing and discarding DoS traffic as and when it arrives at its destination. Such solutions may use resources such as bandwidth and Central Processing Unit (CPU) cycles (at the destination), to process the entire volume of DoS traffic received at the destination, and hence this solution unduly burdens the destination.

One class of conventional router-based solutions involves the configuration of certain routers in the network, which detect and filter DoS traffic. This solution requires updating and replacing routers, which may result in an increase in the cost of setting up the network. Another conventional router-based solution involves pushing back the process of detection and filtration to upstream routers, i.e., toward the originating source of the DoS traffic. However, such solutions do not enable reliable identification of the originating source of a data packet, and hence are unable to solve the problem completely.

Accordingly, there is a continuing need for achieving reliable identification of, and defensibility against, undesirable traffic in a network.

SUMMARY

Implementation of accountability among Autonomous Systems (ASs) in a network is described. Accountability ensures reliable identification of various customers within the ASs and provides defensibility against malicious customers within the ASs. In one implementation, reliable identification is achieved by implementing ingress filtering on data packets originating within individual ASs, and defensibility is provided by filtering data packets on the basis of certain filter requests, referred to as "on-request filtering". To facilitate on-request filtering, each individual AS or a group of certain ASs is equipped with a Filter Request Server (FRS) that arranges the filtering of data packets between customers identified in a particular filter request. Thus, when a requesting customer makes a filter request against an offending customer, the FRS associated with the AS to which the offending customer belongs conducts on-request filtering. Consequently, the FRS installs an on-request filter on a device within that AS, based on which the device filters any data packet sent from the offending customer to the requesting customer. An AS is therefore said to be "accountable" when it implements, in combination, the ingress filtering and on-request filtering. Accountable ASs in the network can agree to label data packets according to whether a data packet originated from a known and trustworthy originating source. Further, the accountable ASs implement various techniques for handling various kinds of attacks and misbehavior of a peer AS.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to implementing accountability in a network of Autonomous Systems (ASs) to reduce the impact of attacks, such as Distributed Denial-of-Service (DDoS) attacks. A network is said to be accountable when the sources of all traffic within it can be accurately and reliably identified and receivers have the ability to effectively block traffic to them from any such source. In this manner, an accountable network provides a mechanism for assigning responsibility to individual customers for data packets that originate from them.

Accountability combines two components: identification and defensibility. With identification, originators of traffic can be identified, for instance, by an address or some other persistent attribute (i.e., one that is relatively difficult to create, re-create, or change). Once identified, defensibility means that destinations are able to prevent traffic from a source with a particular address or persistent attribute from affecting their use of the network. Thus, a destination in an accountable network can identify an originating source of a data packet correctly and subsequently defend itself against any malicious traffic sent by the originating source. The accountable network further exploits pre-existing business relationships between ASs and their customers and peers.

Multiple and varied implementations and embodiments are described below. In the following section, an exemplary network environment that is suitable for practicing various implementations is described initially. After this discussion, representative implementations of systems, devices, and processes for implementing accountability in a network are described in the subsequent sections.

Exemplary Network with Accountability

Figure 1:
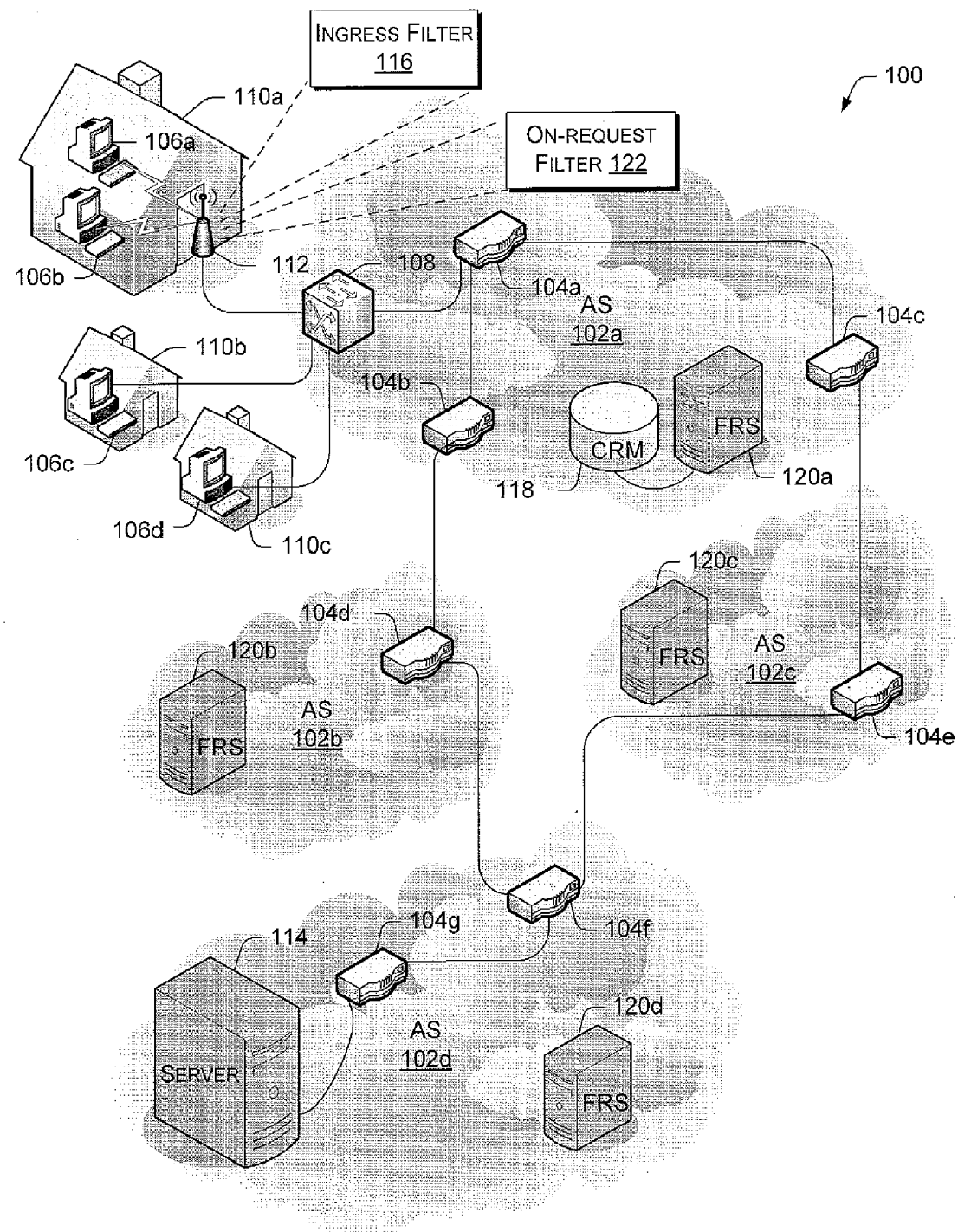
FIG. 1 is a block diagram illustrating an exemplary environment in which accountability in a network may be implemented.

FIG. 1 shows a network 100 that is suitable for practicing various implementations of network accountability. For discussion purposes, network 100 includes a plurality of Autonomous Systems (ASs), represented by the four interconnected ASs 102a, 102b, 102c, and 102d illustrated pictorially as clouds, although certain aspects of the implementations described below may be practiced with a single AS. Generally, an AS is an organization that operates a network. As such, it might be embodied as a collection of IP networks and routers under the control of one entity (or sometimes more) that presents a common routing policy to the Internet. Each AS 102a-102d has one or more routers, as represented by routers 104a-104g. More specifically, AS 102a has routers 104a, 104b, and 104c; AS 102b has router 104d; AS 102e has router 104e; and AS 102d has routers 104f and 104g.

An AS can be, for example, an administrative domain, an Internet Service Provider (ISP), or a transit AS that provides connectivity between two networks. The network of ASs 102a-102d can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, a network may be a wireless or a wired network, or a combination thereof.

By way of example, in the illustrated arrangement of FIG. 1, autonomous system 102a represents a large Digital Subscriber Line (DSL) provider that provides services to its customers. Autonomous system 102d represents an ISP that provides services to its customers. Autonomous systems 102b and 102c represent transit ASs that provide connectivity between AS 102a (i.e., DSL provider) and AS 102d (i.e., ISP). The customers within an AS can be, for example, network devices, Personal Computers (PCs), media devices, Data Processing Units (DPUs), Personal Digital Assistants (PDAs), controlled or owned domains, content-delivery sites, servers, Network Management Systems (NMSs), and so forth.

The example DSL provider's AS 102a provides services to multiple customers, represented as customers 106a-106d, through a DSL Access Multiplexer (DSLAM) 108. Customers 106a and 106b represent two different customers who reside in the same house 110a and connect to network 100 through a router 112, which is connected to DSLAM 108. Customers 106c and 106d represent different customers in their own respective houses 110b and 110c and connect to network 100 directly through DSLAM 108.

Router 112 is a first-hop router for customers 106a and 106b. A first-hop router within an AS is a router that is one hop away (i.e., the next connected network infrastructure device) from one or more customers within that AS, and connects these customers with the AS. DSLAM 108 acts as a first-hop network infrastructure device for customers 106c and 106d. In this case, the functionality of DSLAM 108 is similar to that of a first-hop router, i.e., DSLAM 108 is a network infrastructure device that is one hop away from one or more customers within AS 102a, and connects these customers with AS 102a.

Examples of network infrastructure devices include, but are not limited to, routers, DSLAMs, and switches.

In the FIG. 1 arrangement, AS 102d representing an ISP includes a server 114 connected to other ASs in network 100 via routers 104f and 104g. Server 114 represents a customer within AS 102d. Router 104g can be considered a first-hop router for server 114.

DSLAM 108 is connected to router 104a, which is connected to routers 104b and 104c, which are in turn connected to routers 104d and 104e, respectively. Further, routers 104d and 104e are connected to router 104f, which is connected to router 104g. Whenever a customer in network 100 wants to communicate with another customer in network 100, data packets between these customers are routed through appropriate routers 104a-104g. Consequently, customers 106a-106d can communicate with server 114 by following the appropriate router links.

Network 100 is architected to provide accountability among autonomous systems 102a-102d in order to reduce the impact of malicious attacks between customers. Consider, for example, when customer 106a sends Denial-of-Service (DoS) attack packets to server 114 over network 100. With conventional approaches, server 114 attempts to defend itself by distinguishing the DoS attack packets from legitimate data packets it may receive from other customers in network 100, and reducing the cost of processing such DoS attacks. However, processing the DoS attack packets at the network layer still consumes resources such as bandwidth, which, in turn, could render server 114 incapable of providing services to legitimate data packets.

Protection from such DoS attacks at the network layer can be provided by implementing accountability in network 100. Accountability involves the combined implementation of identification through ingress filtering on traffic and defensibility via "on-request filtering" that allows customers to request that traffic to them from specific other customers be blocked at the source. For purposes of ongoing discussion, an AS that implements accountability is referred to as an "accountable AS", whereas an AS that does not implement accountability is referred to as an "unaccountable AS". Accountable ASs generally agree to implement accountability and function in cooperation with each other on a pair-wise basis. Such peering pairs of accountable ASs are referred to as "peering accountable ASs". The peering accountable ASs may sign a peering agreement in which the expectations from a peer AS and the penalties for misbehaving are set forth in detail.

Returning to the arrangement illustrated in FIG. 1, individual ASs 102a-102d implement ingress filtering on data packets originating from their customers to enable reliable identification. When data packets originate from customer 106a, for example, router 112 implements an ingress filter 116 to perform ingress filtering on those data packets.

In one implementation, ingress filter 116 may filter based on an address to ensure that customer 106a used a valid source address assigned to it. In this case, router 112 may access customer information maintained by a Customer Relationship Management (CRM) system 118 included in AS 102a for a list of valid addresses. Alternatively, router 112 can maintain customer information internally, locally, or in some other way.

In addition to addresses, ingress filter 116 may filter packets on the basis of any type of persistent attribute of the originating source of a data packet. The persistent attribute is a set of attributes of the originating source by which the originating source can be uniquely identified in network 100. It is an attribute that is relatively difficult to create, re-create, or change. The persistent attribute can include, but is not limited to, an Internet Protocol (IP) address assigned to the originating source, a port number (or a particular key or keys) assigned to the originating source, and the time period within which the IP address is assigned to the originating source, or any combination thereof. For example, the combination of the IP address, the port number, and the time period would suffice to identify a customer within an AS deploying the Network Address Translation (NAT). In such a scenario, a single IP address is assigned to a number of customers, but each customer has a unique port number (as its identifier) that is dynamically assigned at a particular instant of time. Further, the combination of the IP address and the time period within which the IP address is assigned to the originating source would be sufficient in the case of an AS deploying the Dynamic Host Configuration Protocol (DHCP) or other protocols that change IP addresses from time to time. It is noted that other attributes may be used together with, or separately from, these to identify the originating source customer.

To achieve defensibility, accountable ASs 102a-102d conduct filtering on their customers' traffic, on the basis of filter requests received against these customers. Filter requests are relayed through accountable ASs to ensure that the requests are not misused. Each accountable AS includes at least one Filter Request Server (FRS) which implements the on-request filtering. In an alternative implementation, a plurality of accountable ASs may be equipped with a common FRS. For instance, a single entity may provide the services of on-request filtering, and several ASs may contract out the work to that entity. With reference to FIG. 1, ASs 102a-102d are accountable ASs, and each of ASs 102a, 102b, 102c and 102d includes at least one associated FRSs 120a, 120b, 120c and 120d, respectively. ASs 102a-102d exchange information about their FRSs 120a-120d, so that FRSs 120a-120d can communicate with each other to relay the filter requests. For example, an AS can communicate the IP address of its FRS to other peer ASs. Subsequently, the AS can store the IP addresses of the FRSs associated with its peer ASs in a database, which may be maintained by its FRS. The database may contain registration information about the ASs, such as in the case of American Registry for Internet Numbers (ARIN), Réseaux IP Européens (RIPE), and Asia-Pacific Network Information Centre (APNIC) databases. The database may include Domain Name System (DNS) entries of the FRSs associated with the peer ASs. Filter request servers 120a-120d can be connected to each other through routers within ASs 102a-102d in network 100.

Each filter request server 120a-120d processes filter requests received by it to determine how these filter requests may be implemented. In one embodiment, an FRS may implement a filter request by installing an on-request filter on a network infrastructure device closest to the offending source (e.g., a first-hop network infrastructure device for the offending source), as represented by on-request filter 122 at router 112. On-request filter 122 filters packets from the offending source based on the filter request submitted by a customer in network 100, who does not want to receive traffic from that source. In another embodiment, on-request filter 122 is installed on the FRS, where on-request filter 122 filters data packets forwarded through the FRS based on the filter request. The filter request includes the persistent attribute identifying the offending source against whom the filter request is made. The filter request can also include the time period for which the filter request needs to be imposed. A filter request made by a destination customer is relayed to the accountable AS to which the source customer belongs. Thereafter, the accountable AS sends back an acknowledgement of the receipt of the filter request and conducts the on-request filtering on the basis of the source-destination pair. Depending upon the network routing algorithms used in network 100, the acknowledgement of the receipt of the filter request can be sent back in many ways including one that uses the same route, in the opposite direction, through which the accountable AS received the filter request. However, it is desired that acknowledgements be sent through accountable ASs.

Figure 2:
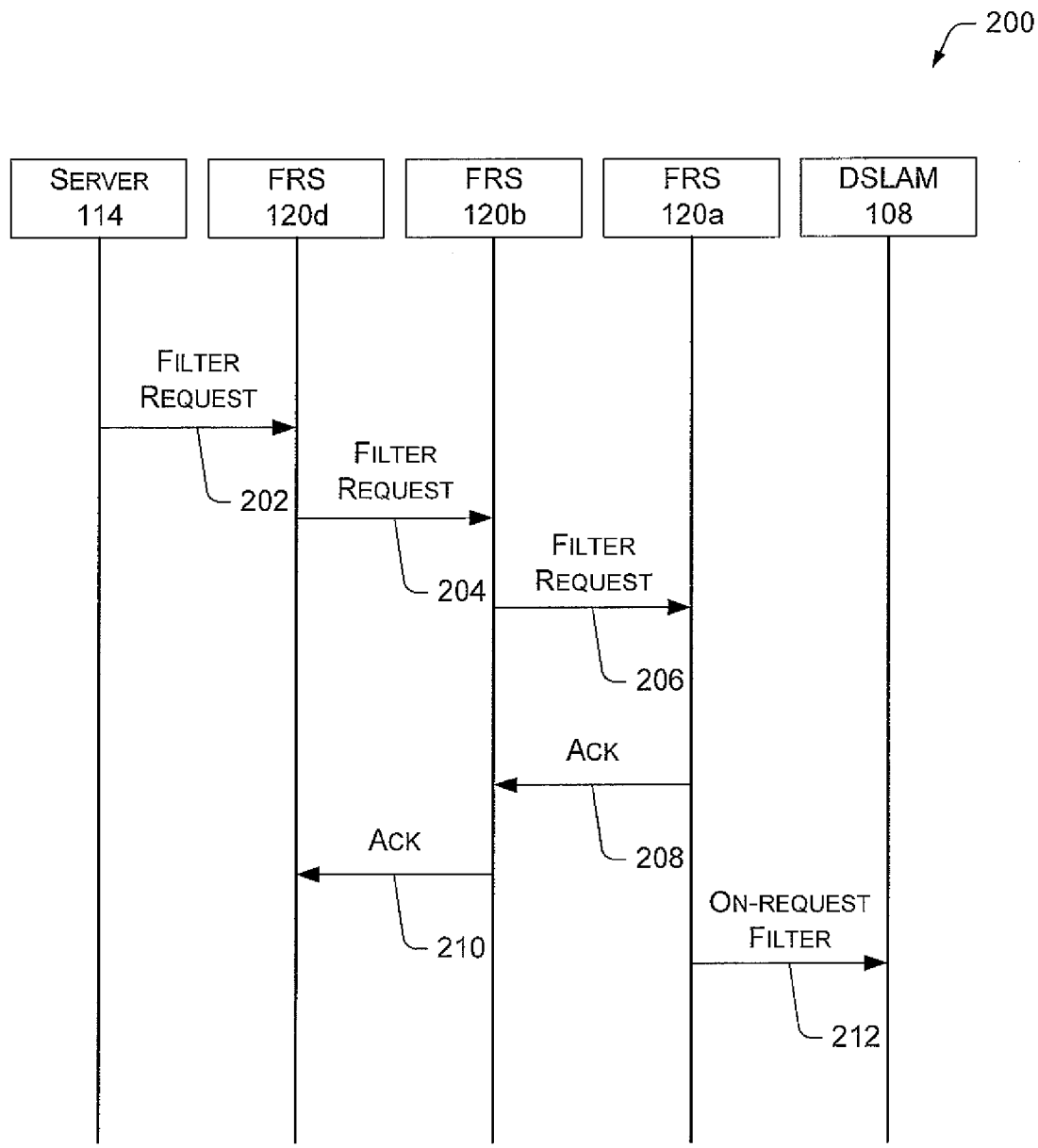
FIG. 2 is a data flow diagram illustrating a data flow in conducting on-request filtering according to one possible implementation.

To illustrate on-request filtering, an example will now be described with reference to FIGS. 1 and 2. FIG. 2 illustrates a data flow 200 for conducting on-request filtering within the accountable network 100 of FIG. 1. For this example, assume customer 106a in AS 102a sends DoS attack packets to server 114 in AS 102d. Further, assume that all four ASs 102a-102d are accountable ASs having respective filter request servers 120a-120d.

To combat this attack, server 114 sends a filter request against customer 106a to FRS 120d within the same AS 102d (flow arrow 202 in FIG. 2). When FRS 120d receives the filter request, it determines how to route the filter request to FRS 120a in AS 102a that services the originating customer 106a. As part of this determination, FRS 120d determines a neighboring AS through which it can forward the filter request and forwards the filter request to an FRS within the neighboring AS.

In one particular implementation, upon receiving the filter request, FRS 120d runs a session with one of its routers on the basis of the network routing protocol used in AS 102d to discover routes to customer 106a. For example, FRS 120d can run an internal Border Gateway Protocol (iBGP) peering session with one of its routers. Based on the iBGP peering session, FRS 120d discovers BGP routes to customer 106a, and determines a neighboring AS through which it can relay the filter request to an AS that includes customer 106a (i.e., AS 102a).

Consequently, FRS 120d forwards the filter request to neighboring FRS 120b (flow arrow 204 in FIG. 2). It should be noted that FRS 120d can forward the filter request to either FRS 120b or FRS 120c, since both ASs are accountable. However, in the event one of ASs 102b and 102c is accountable and the other one is unaccountable, FRS 120d sends the filter request to the FRS within the accountable AS.

After receiving the filter request from FRS 120d, FRS 120b forwards the filter request to FRS 120a (flow arrow 206 in FIG. 2). In this way, a filter request is relayed to an FRS within an accountable AS to which a source customer belongs, through a chain of neighboring ASs.

On receiving the filter request, FRS 120a sends an acknowledgement (ACK) of the receipt of the filter request back to FRS 120d, through FRS 120b (flow arrows 208 and 210 in FIG. 2).

Subsequently, the enforcing FRS 120a may look up the IP address of customer 106a in the local network routing protocol, such as the Open Shortest Path First (OSPF) protocol and the Intermediate System to Intermediate System (IS-IS) protocol, and may find that this IP address has been assigned to DSLAM 108. In addition, the enforcing FRS 120a may look up customer information maintained in CRM system 118, on the basis of the persistent attribute of customer 106a, and find that the IP address is currently used by a customer in house 110a, which has a DSL subscription from DSLAM 108. Since CRM system 118 knows about only one DSL subscription from house 110a (i.e., a single account and single IP address on that DSLAM port), it cannot distinguish between customers 106a and 106b. Subsequently, FRS 120a installs an on-request filter at DSLAM 108 (flow arrow 212 in FIG. 2), which filters any data packet sent from customers 106a and 106b to server 114.

In certain scenarios, DSLAM 108 has a Broadband Remote Access Server (BRAS) associated with it, which is capable of identifying individual customers 106a and 106b. Therefore, the BRAS would be able to filter data packets sent from customer 106a to server 114, while allowing data packets sent from customer 106b to server 114. Alternatively, if house 110a had an FRS at router 112, which it had registered with FRS 120a, FRS 120a could have forwarded the filter request onto this FRS. In this scenario, the FRS at router 112 could have identified customer 106a as the customer against whom the filter request had been made, by looking at the source port number and the time period (i.e., the persistent attribute) in the filter request, and could have installed an on-request filter on router 112 to filter any data packet sent from customer 106a to server 114. As mentioned above, an accountable AS may include multiple FRSs. The FRSs may be responsible for conducting on-request filtering on customers associated with them. For example, each FRS within an accountable AS may be associated with a different range of customer IP addresses. Alternatively, the FRSs may be responsible for conducting on-request filtering based on customers who made the filter requests. For example, the accountable AS may assign a first FRS to conduct on-request filtering based on filter requests received from customers within a first peer AS, a second FRS to conduct on-request filtering based on filter requests received from customers with a second peer AS, and so on.

In this way, identification and on-request filtering reduce DoS attacks in network 100. It should be noted that protocols such as iBGP, OSPF, IS-IS can be easily replaced by other protocols that achieve the same goal in the art.

Incremental Deployment of Accountability

In the above implementations, all autonomous systems 102a-102d were accountable. However, in large networks, it is anticipated that not all autonomous systems will be accountable; rather, accountability may be implemented only partially in network 100. In such a scenario, peering accountable ASs can agree to label data packets according to whether they originate from customers within accountable ASs (and hence within a trusted network) or from customers within unaccountable ASs (and hence from an unknown and untrustworthy originating source).

In one example implementation, the data packets can be labeled with an "accountability bit", which indicates whether the data packet originated from an accountable AS or an unaccountable AS. As one possible approach, the unused bit in the IPv4 headers of data packets can be used as the accountability bit. In such a case, the peering accountable ASs may set the accountability bit to OFF, for example, for data packets originating from the unaccountable ASs. In addition, the accountability bit may be set to OFF for data packets that originated from accountable ASs, but were routed through one or more unaccountable ASs before they entered an accountable AS. In contrast, the peering accountable ASs may set the accountability bit to ON for data packets originating from their customers and routed through accountable ASs. It is noted that in other implementations, one or more other free bits may be used for this purpose and ON/OFF polarity may be reversed. A more detailed example of using the accountability bit is described below in more detail with reference to FIGS. 7 and 8.

By labeling packets, peering accountable ASs can effectively create sub-networks of accountable ASs. In this way, data packets originating from their customers are routed through these sub-networks without passing through unaccountable ASs, thereby allowing for partial and incremental deployment of accountable sub-networks within a larger network.

Figure 3:
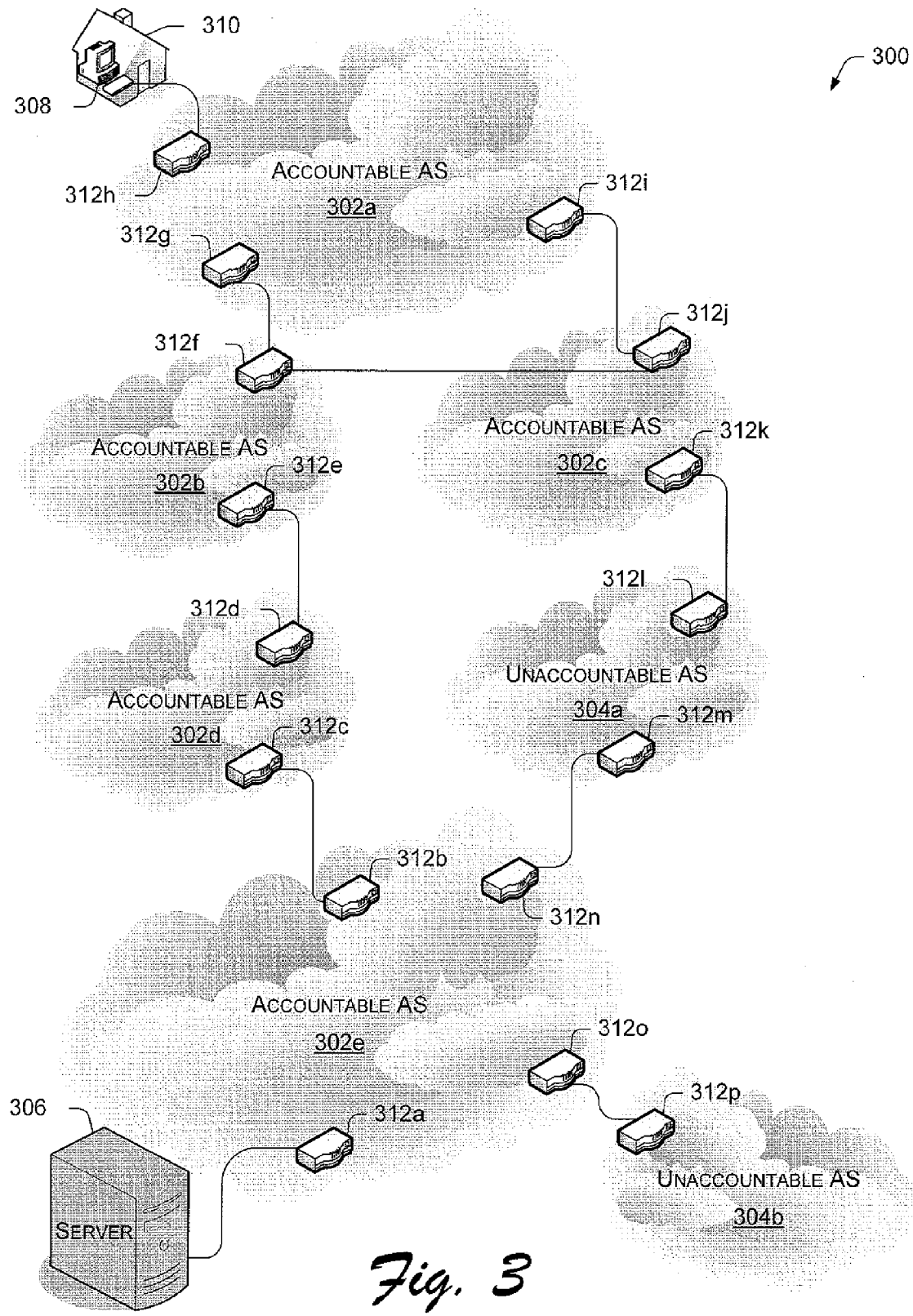
FIG. 3 is a block diagram illustrating incremental implementation of accountability across a network of Autonomous Systems (ASs) in an exemplary implementation.

FIG. 3 illustrates incremental implementation of accountability within an exemplary network 300, which includes a plurality of accountable ASs 302a-302e and a plurality of unaccountable ASs 304a-304b. Accountable ASs 302a-302e are connected together to form a sub-network of accountable ASs within exemplary network 300. Through this sub-network, accountable ASs 302a-302e can route data packets originating from their customers to one another without traversing an unaccountable AS 304a or 304b.

For example, suppose a data packet originating from a server 306 (a customer within accountable AS 302e) is to be sent to a customer 308 in a house 310 (a customer within accountable AS 302a). This data packet can be routed through an appropriate router link involving routers 312a-312k within accountable ASs 302a-302e. During this travel, the accountability bit may be maintained as ON to indicate that the data packet originated from customers within accountable ASs and routed through accountable ASs.

If the data packet is inadvertently transmitted through unaccountable AS 304a (i.e., via routers 312n, 312m, 312l, and 312k), its accountability bit is reset to OFF by accountable AS 302c on receiving the data packet from unaccountable AS 304a.

Formation of a sub-network by accountable ASs can be useful when the number of DoS attacks from malicious customers within unaccountable ASs increases substantially. In such a scenario, accountable ASs 302a-302e within the sub-network may either decide to give preference to data packets originated and routed within the sub-network (i.e., data packets that have accountability bit set to ON) or decide to preferentially drop data packets received from outside the sub-network (i.e., data packets that have accountability bit set to OFF). For this purpose, accountable ASs 302a-302e may implement the Random Early Detection (RED) technique in routers 312a-312k. This differential treatment of data packets may provide an incentive to unaccountable ASs 304a-304b to implement accountability so that their customers' data packets are accepted and given preference by accountable ASs 302a-302e.

As mentioned above, it is desired to send acknowledgements of filter requests through accountable ASs. Therefore, accountable ASs 302a-302e send acknowledgements through appropriate router links within their sub-network.

The formation of sub-networks of accountable ASs makes the implementation of accountability in the peering accountable ASs robust. Even when accountability has been implemented partially, the peering accountable ASs are capable of defending themselves against various kinds of attacks.

Exemplary AS and FRS

Figure 4:
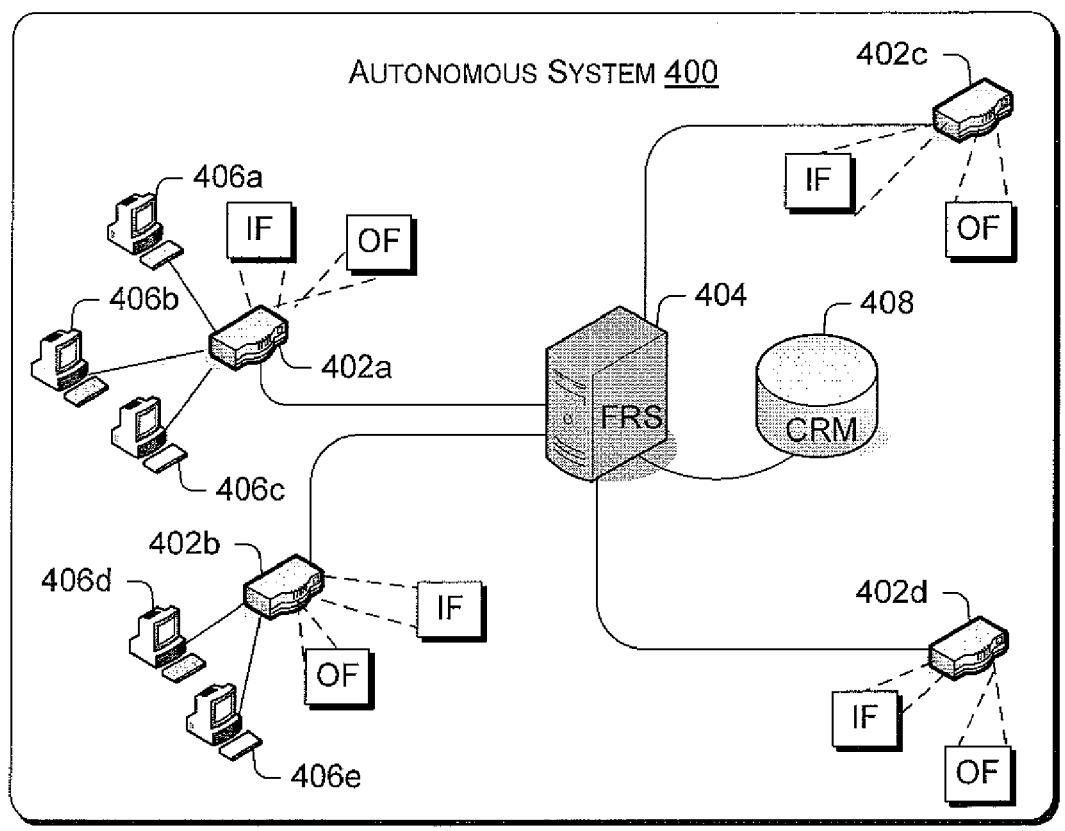
FIG. 4 is a block diagram illustrating a system configured to implement accountability.

FIG. 4 illustrates example components and devices that may be provided within an autonomous system 400 to implement accountability. The components of autonomous system 400 include, but are not limited to, one or more devices that implement ingress filters (IF), such as routers 402a-402d, and at least one filter request server 404 configured for installing on-request filters (OF) on appropriate routers 402a-402d. The one or more devices can be, for example, first-hop network infrastructure devices for customers within the accountable ASs. Further, autonomous system 400 includes one or more customers 406a-406e and a CRM system 408 that maintains information about the attributes of the one or more customers 406a-406e.

Further, the one or more devices may be configured to reset the accountability bit in data packets to OFF, when the number of filter requests received against the originating sources of the data packets exceeds a predefined offending threshold. In such a case, the one or more devices can be the first-hop network infrastructure devices for the customers within the accountable ASs. For example, router 402a can reset the accountability bit in data packets originating from customer 406b to OFF, if the number of filter requests received against customer 406b exceeds the predefined offending threshold.

Furthermore, the one or more devices may also be configured to determine whether each data packet contains at least one accountability bit, and thereby handle accountable and unaccountable data packets differently. The one or more devices may further be configured to set the accountability bit in data packets to one of ON and OFF, on the basis of identification of their originating sources. In both the cases, the one or more devices can be routers within an AS that provide connectivity to other ASs. In this way, accountable ASs can protect their customers from malicious data traffic, such as DoS attacks.

Figure 5:
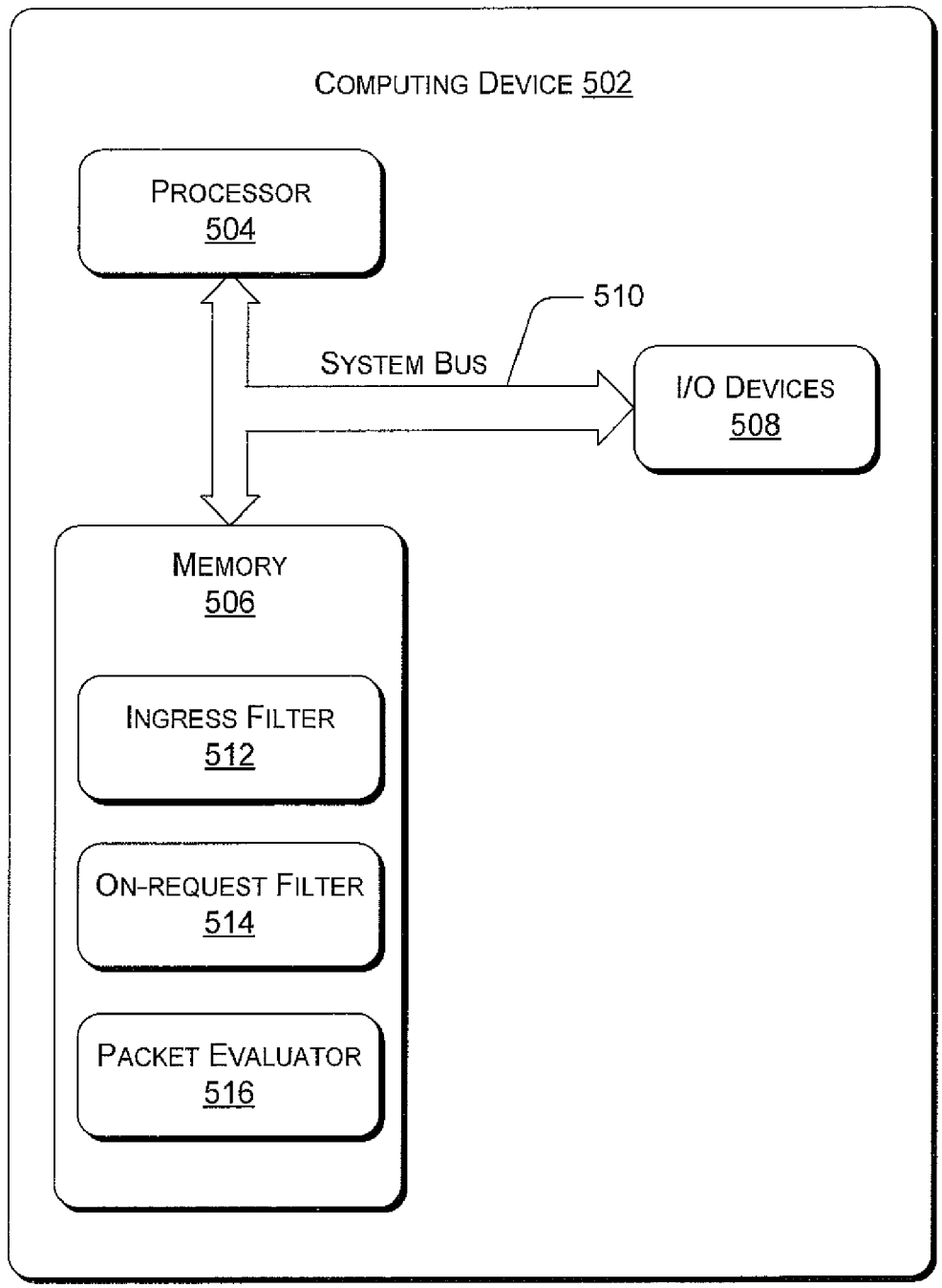
FIG. 5 is a block diagram illustrating various components in one exemplary implementation of a computing device.

FIG. 5 illustrates various components of an exemplary computing device 502 in more detail. Computing device 502 can include, but is not limited to, a processor 504, a memory 506, Input/Output (I/O) devices 508 (e.g., keyboard and mouse), and a system bus 510 that operatively couples various components including processor 504 to memory 506.

System bus 510 represents any of the several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus.

Memory 506 includes computer-readable media in the form of volatile memory, such as Random Access Memory (RAM) and/or non-volatile memory, such as Read Only Memory (ROM) or flash RAM. Memory 506 typically contains data and/or program modules for implementing ingress filtering and conducting on-request filtering that are immediately accessible to and/or presently operated on by processor 504.

Memory 506 stores an ingress filter 512 to be applied on data packets originating from customers associated with computing device 502 (e.g., customers for whom computing device 502 is a first-hop network infrastructure device). Processor 504 executes ingress filter 512 to perform ingress filtering on the data packets. For this purpose, processor 504 may access customer information maintained by a CRM system included in the AS to which computing device 502 belongs.

Memory 506 stores an on-request filter 514 to be imposed on certain offending customers within the AS to which computing device 502 belongs. On-request filter 514 is installed on computing device 502 by an FRS associated with the AS. On-request filter 514 imposes restrictions on traffic based on one or more filter requests received by the FRS from a customer requesting to filter data packets sent from an offending customer to the requesting customer. Processor 504 executes on-request filter 514 to filter data packets originating from the offending customers accordingly.

Memory 506 may further store a packet evaluator 516 for evaluating various data packets arriving from other ASs, while processor 504 executes packet evaluator 516 to determine whether these data packets originated from a known and trusted originating source, and to handle them differently depending upon the determination. In an embodiment, packet evaluator 516 evaluates data packets on the basis of the accountability bit of the data packets.

An accountable AS may include one or more such computing devices, as has been illustrated in the above example, to implement accountability in network 100. It should be noted that a router or any other network infrastructure device can be configured to perform the functionality of computing device 502. Thus, computing device 502 is one example of a computing device and is not intended to suggest any limitation as to the scope of use or functionality of such a computing device. Neither should computing device 502 be interpreted as having any dependency or requirement relating to any one or combination of components illustrated in the example. Further, the functionality described above may be distributed among multiple devices, such as having ingress filters resident at one device (e.g., first-hop network infrastructure devices) and on-request filters resident at another device (e.g., routers within an AS that receive data packets from other ASs).

Generally, program modules executed on the components of autonomous system 400 or computing device 502 include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media".

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by a computer.

"Communication media" typically embodies computer-readable instructions, data structures, program modules, or other data in a modulated data signal such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or a direct-wired connection, and wireless media such as acoustic, RF, infrared, and other wireless media. Combinations of any of the above are also included within the scope of computer-readable media.

Accountability Processes

Figure 6:
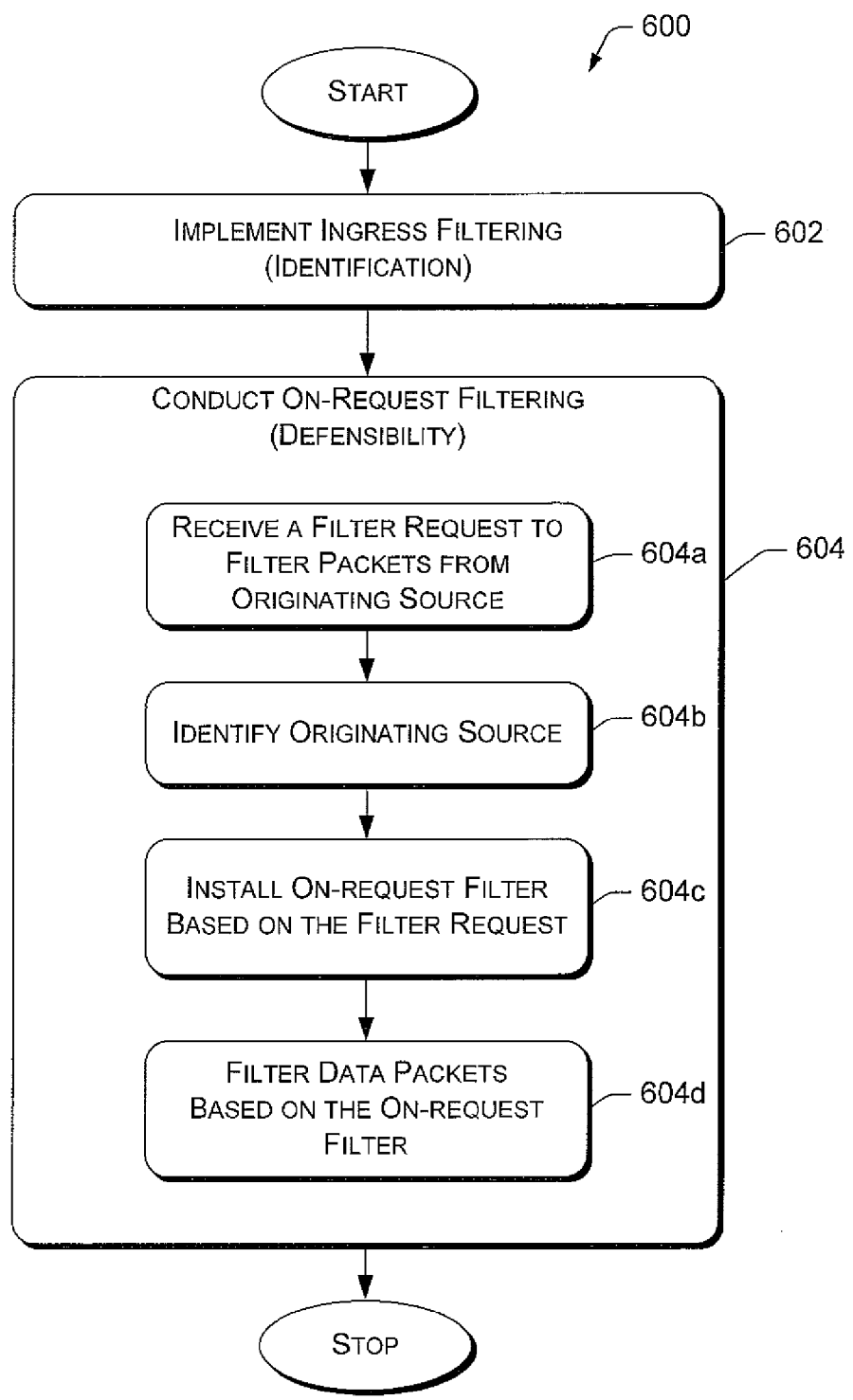
FIG. 6 is a flow diagram illustrating an exemplary process for implementing accountability in the network.

FIG. 6 illustrates a process 600 for implementing accountability in network 100 of autonomous systems. The process 600 (as well as other processes described below) is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 600 is described with reference to network 100 shown in FIG. 1. It will be apparent to a person ordinarily skilled in the art that network 100 is shown for exemplary purposes and the process 600 may be implemented in other systems or network architectures.

At block 602, ingress filtering is implemented within an accountable network. More specifically, peering accountable ASs implement ingress filtering. As explained above, each first-hop network infrastructure device in the peering accountable ASs is configured to implement ingress filtering on data packets originating from customers associated with it. With reference to FIG. 1, router 112 is configured to perform ingress filtering on data packets that originate from customers 106*a* and 106*b*. Ingress filtering ensures reliable identification of the originating sources of data packets, and reliable identification is a prerequisite for achieving defensibility.

At block 604, on-request filtering is conducted within the accountable network to achieve defensibility. In the examples described herein, each AS is equipped with at least one Filter Request Server (FRS) that is configured to conduct on-request filtering. In one implementation, on-request filtering 604 may be performed in three sub-processes. At block 604*a*, an FRS associated with an AS receives a filter request to block packets from an originating source. That source may be a customer within the same AS. For example, when a customer within AS 102*d* sends DoS attack packets to server 114, server 114 makes a filter request against that customer to FRS 120*d*. Alternatively, the filter request may have been made by a requesting customer within another AS and forwarded to the FRS. For example, when customer 106*a* sends DoS attack packets to server 114, server 114 makes a filter request against customer 106*a* to FRS 120*d*, which is relayed to FRS 120*a* through appropriate FRSs.

After receiving the filter request, the FRS identifies the originating source on the basis of its persistent attribute that is included in the received filter request (block 604*b*). Thereafter, at block 604*c*, the FRS installs an on-request filter on a first-hop network infrastructure device associated with the originating source. Subsequently, at block 604*d*, the first-hop network infrastructure device filters data packets sent from the originating source to the requesting customer, based on the installed on-request filter.

It should be noted that identification (block 602) and defensibility (block 604) are ongoing processes and can be performed simultaneously in network 100 to enable accountability.

Using Accountability Bits

As mentioned above, the peering accountable ASs can agree to label data packets to indicate whether they originated from known and trusted originating sources or not using one or more accountability bits. In such situations, an accountable AS can implement a priority scheme such as DiffServ, in which accountable data packets are prioritized over unaccountable data packets and handled differently. For example, in one such case, an unaccountable data packet may be forwarded to its destination customer only when the aggregate traffic to the destination customer is below a predefined traffic threshold. The predefined traffic threshold may be defined by the system administrator of the accountable AS (or by other suitable means). In another case, only accountable data packets may be forwarded to their destination customers.

The accountability bit can also be used by the peering accountable ASs to mark data packets sent by some of their customers against whom they receive a large number of filter requests. In such cases, an accountable AS may reset the accountability bit in data packets originating from some of its customer to OFF, when the number of filter requests received against these customers exceeds the predefined offending threshold. The predefined offending threshold may be defined by the system administrator of the accountable AS (or by other suitable means).

Once the accountability bit is set, the peering accountable ASs agree to preserve the setting of the accountability bit in data packets flowing through them. However, if a data packet flows through an unaccountable AS on its way to an accountable AS, the accountability bit may need to be reset when the data packet enters an accountable AS. In an embodiment, the peering accountable ASs may configure their routers to send data packets originating from their customers through accountable peers. For purposes of continuing discussion, a data packet entering an AS is referred to as an "incoming" data packet.

Figure 7:
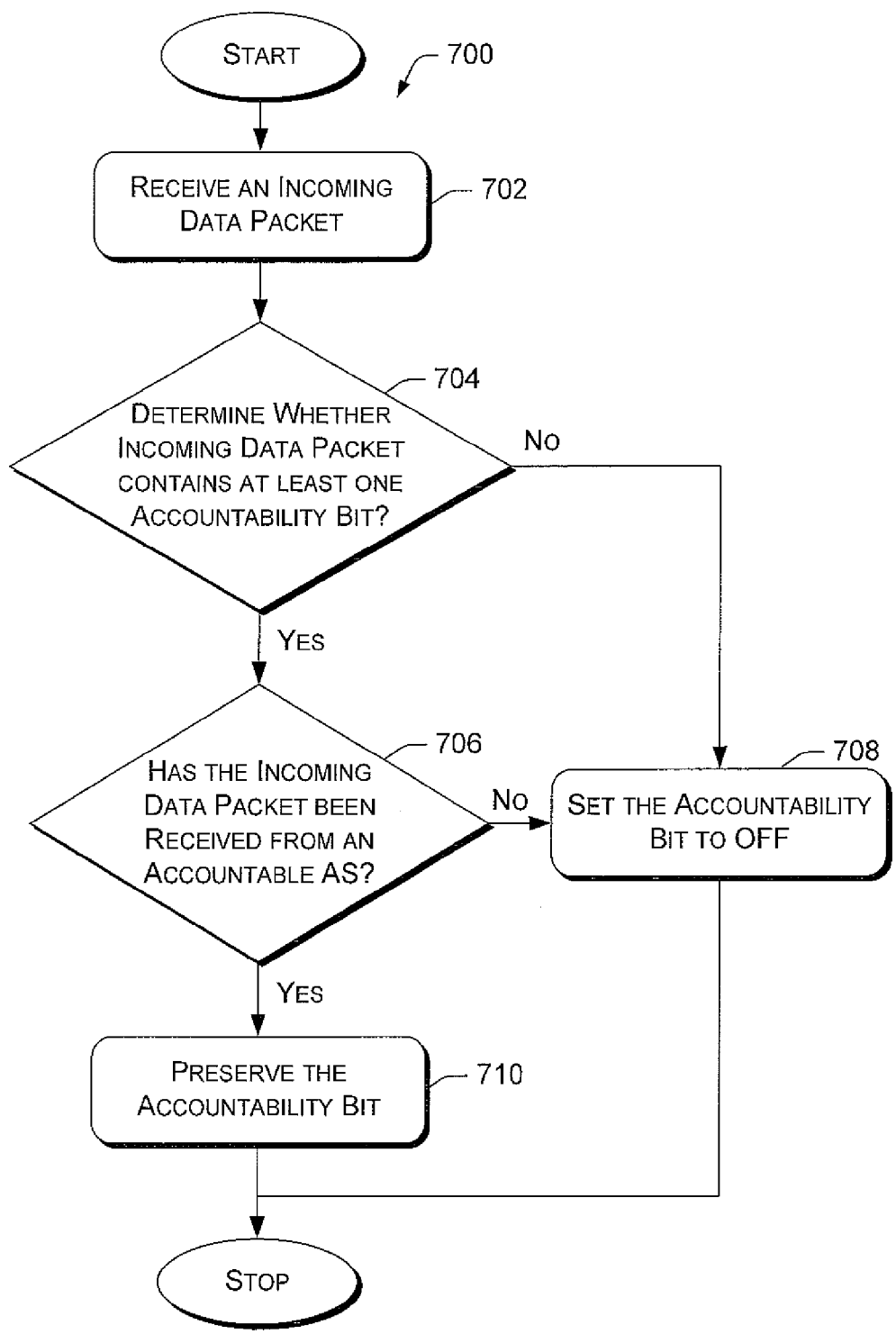
FIG. 7 is a flow diagram illustrating an exemplary process for setting an accountability bit in an incoming data packet.

FIG. 7 illustrates a process 700 for setting the accountability bit in an incoming data packet, according to an embodiment. At block 702, an accountable AS receives an incoming data packet from another AS in network 100. At block 704, the accountable AS determines whether the incoming data packet contains at least one accountability bit. If it does not contain any (i.e., the "No" branch from block 704), it is implied that the incoming data packet has been received from an unaccountable AS. Consequently, the accountable AS sets the accountability bit to OFF (block 708).

With reference to block 704, if the incoming data packet contains at least one accountability bit (i.e., the "Yes" branch from block 704), the accountable AS determines whether the incoming data packet has been received from another accountable AS (block 706). If it has not been received from an accountable AS (i.e., the "No" branch from block 706), it is implied that the accountable AS has received the incoming data packet from an unaccountable AS. Consequently, the accountable AS resets the accountability bit to OFF (block 708). If it has been received from an accountable AS (i.e., the "Yes" branch from block 706), the accountable AS preserves the setting of the accountability bit (block 710).

As explained above, an accountable AS sets the accountability bit in data packets originating from customers within that accountable AS. For purposes of continuing discussion, such a data packet is referred to as an "originating" data packet.

Figure 8:
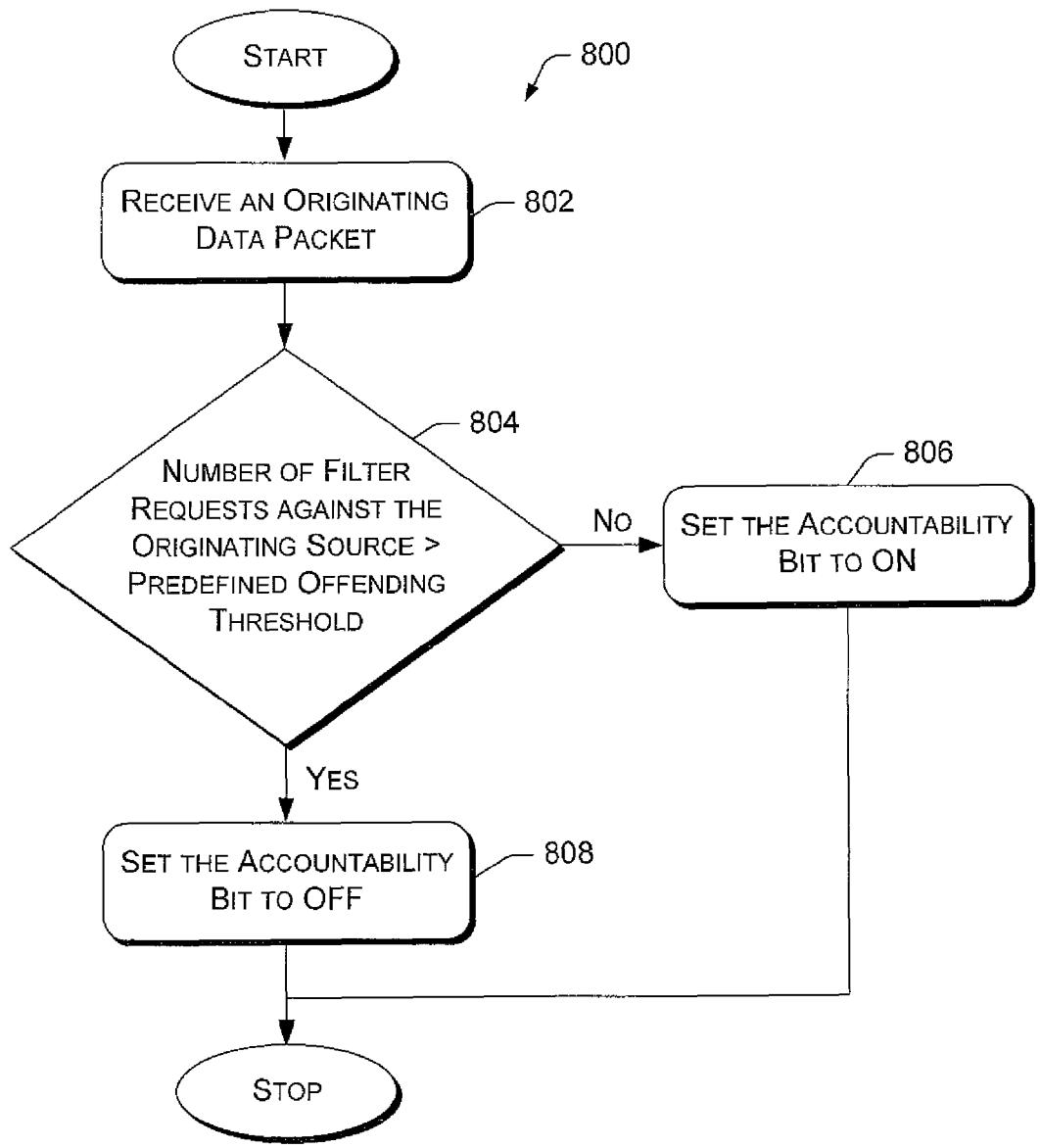
FIG. 8 is a flow diagram illustrating an exemplary process for setting the accountability bit in an originating data packet.

FIG. 8 shows a process 800 for setting the accountability bit in an originating data packet within an accountable AS, according to one embodiment. At block 802, a first-hop network infrastructure device within the accountable AS receives an originating data packet from its originating source associated with the first-hop network infrastructure device. As explained above, the first-hop network infrastructure device performs ingress filtering on the originating data packet. For example, with reference to FIG. 1, router 112 performs ingress filtering on data packets originating from customers 106*a* and 106*b*.

At block 804, the accountable AS determines whether the number of filter requests against the originating source exceeds the predefined offending threshold. This determination can be performed by the first-hop network infrastructure device. If the number of filter requests does not exceed the predefined offending threshold, the accountability bit in the originating data packet is set to ON (block 806). If the number of filter requests exceeds the predefined offending threshold, the accountability bit in the originating data packet is set to OFF (block 808).

In this way, the accountability bit is set for data packets flowing in network 100. The setting of the accountability bit can be used to ensure accountability in network 100. In another embodiment, accountability is ensured by implementing ingress filtering along with setting the accountability bit in data packets. As explained above, individual ASs implement ingress filtering. Subsequently, the peering accountable ASs use the accountability bit to distinguish accountable data packets from unaccountable data packets, and thereby handle them differently.

Attacks on FRS and AS Misbehavior

The peering accountable ASs perform reliable identification, therefore customers within the accountable ASs may find it difficult to launch spoofing attacks in a peering accountable network. Moreover, the peering accountable ASs mark the accountability bit in data packets received from the unaccountable ASs. Therefore, unaccountable data packets can be handled accordingly.

However, malicious customers within the peering accountable ASs can attempt various other kinds of attacks to disrupt the work of customers in network 100. In one kind of DoS attack, malicious customers may try to overload the FRSs in the accountable ASs with a large number of "false" filter requests, to prevent the FRSs from accepting filter requests from other customers. To counter this problem, an FRS associated with an AS can apply filters on routers in the AS so that they filter traffic from such malicious customers within the same AS. To filter traffic from malicious customers within another AS, the FRS can send filter requests to an FRS associated with the other AS. Details pertaining to the identification and handling of false requests have been provided below.

One method of solving this problem is for the peering accountable ASs to provide different types of subscriptions. For example, FRSs 120a-120d can provide two types of subscriptions, limited and unlimited. In a limited subscription, FRSs 120a-120d may not allow filter requests beyond a predefined filter-request threshold. This predefined filter-request threshold may be defined by the system administrators of the accountable ASs. In an unlimited subscription, FRSs 120a-120d may allow an unlimited number of filter requests. FRSs 120a-120d can maintain information about the subscription types of their customers in their CRM systems, and charge subscription fees, if any, accordingly. In addition, FRSs 120a-120d can set a limit on the rate at which their customers can send filter requests to them. When an FRS associated with an AS first receives a filter request from a customer within the same AS, it checks whether that customer is entitled to make a filter request. If the FRS finds that the customer has exceeded the set limit, the FRS may decide to ignore any further requests from that customer.

In another kind of DoS attack, malicious customers may try to send a large number of filter requests to FRSs 120a-120d against innocent customers. For example, a compromised customer (e.g., a customer under the control of a malicious customer) may make a request for long-lived filters (e.g., filters for long time periods) against the sources from which traffic is actually desired, thereby filtering any desired traffic even after the customer is no longer compromised. Such a situation can be solved by implementing revocation of filter requests as a part of the repair process.

Alternatively, FRSs 120a-120d can also set a limit on the rate at which filters can be applied on a customer. This can be achieved by ignoring filter requests that arrive faster than the set limit, while allowing requesting destination customers to send the filter requests again. Therefore, after applying some filters, an FRS can notify the customer against whom the filter requests are accumulating, and give the customer an opportunity to either dispute the implicit accusation or stop sending malicious traffic. For example, if the customer claims innocence, then the FRS can agree to log the destination addresses of data packets sent by the customer, to check whether future filter requests are arriving from customers that correspond to the logged destination addresses. If the filter requests are being made by customers who do not correspond to the logged destination addresses, the FRS may ignore them. In this way, the FRS can identify false filter requests and ignore them.

In addition, FRSs 120a-120d can also define certain customers such as servers, whose filter requests are applied with minimum delay. FRSs 120a-120d can maintain such information in their CRM systems.

Further, malicious customers within the unaccountable ASs can try to send reflection attack traffic to customers within the accountable ASs. In a reflection attack, the attacker tries to spoof the source address of the target, in order to fool another device (the reflector) into sending reply packets of some kind to the target. For example, it is possible that a malicious customer within an unaccountable AS can launder the OFF setting of the accountability bit in its attack traffic by reflecting it off a customer within an accountable AS. Such a situation can be avoided if customers in the accountable ASs preserve the setting of the accountability bit when they reply to the source of each incoming data packet. However, this solution requires that the customers within the accountable ASs be upgraded to recognize and preserve the setting of the accountability bit.

In order to check whether customers within an accountable AS have been upgraded to recognize and to preserve the setting of the accountability bit, the accountable AS sends an initial packet to a customer being tested, with its accountability bit being set to OFF. The customer passes the test if the response to that initial packet has its accountability bit set to OFF. Further, the customers within the accountable ASs can be upgraded to network stacks that preserve the setting of the accountability bit in the data packets received. A network stack can be, for example, a software implementation of the network routing protocol. Furthermore, the accountable ASs may perform tests often enough to ensure that their customers are not downgraded.

Further, an AS claiming to be implementing accountability may in fact not be implementing either identification or defensibility. It should be noted that if an AS does not implement on-request filtering, other accountable ASs may notice that their filter requests are being ignored. For example, when a first customer within a first AS makes a filter request against a second customer within a second AS, the first AS forwards the filter request to the second AS, which then sends back an acknowledgement to the first AS. However, if the first AS finds that data packets from the second customer are still arriving with their accountability bit set to ON, it identifies the second AS as a misbehaving AS. In this way, it is easy to detect whether a particular AS is conducting on-request filtering properly. Of course, accountable ASs peering with such misbehaving ASs may decide to reset the accountability bit of data packets arriving from the misbehaving ASs to OFF and impose other penalties on the misbehaving ASs.

However, if the AS does not implement ingress filtering, other accountable ASs may have to rely on sampled traffic statistics to identify such an AS malfunction. For example, if an AS receives complaints that another AS is failing to filter malicious data packets from its customers, the AS can sample the traffic arriving from its neighboring ASs, and find the neighboring AS from which the malicious data packets are arriving. Further, the AS may ask the neighboring AS to deal with the problem. The neighboring AS may also push back the problem to another neighboring AS, and this process can be continued until the last accountable AS confronts the misbehaving AS from which the malicious data packets are originating. Subsequently, the last accountable AS may decide to reset the accountability bit of data packets arriving from the misbehaving AS to OFF and may impose other penalties on the misbehaving AS.

In this way, the peering agreement between the accountable ASs can result in a reduction in DoS attacks and other kinds of attacks, while providing an incentive to the unaccountable ASs to be a part of the accountable network. The peering accountable ASs may share subscription fees, if any, among themselves to provide an incentive to ASs that do not have any customers (e.g., transit ASs).

CONCLUSION

Although the subject matter has been described in a language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   implementing ingress filtering on data packets at individual Autonomous Systems (ASs) in a network;
   conducting on-request filtering within the network, comprising:
      receiving a filter request from a first customer within a first AS in the network, wherein the filter request is made by the first customer to filter data packets sent from a second customer within a second AS in the network to the first customer; and
      filtering the data packets sent from the second customer to the first customer based on the filter request;
   setting at least one accountability bit in a data packet based on an identification of an originating source of the data packet, the accountability bit indicating whether the originating source of the data packet is a known and trusted originating source; and
   resetting the at least one accountability bit in the data packet when a number of filter requests received against the originating source of the data packet exceeds a predefined threshold.

2. A method as recited in claim 1, wherein the ingress filtering on a data packet is implemented based on a persistent attribute of an originating source of the data packet, the persistent attribute uniquely identifying the originating source.

3. A method as recited in claim 2, wherein the persistent attribute of the originating source comprises one or more of an Internet Protocol (IP) address assigned to the originating source, a port number assigned to the originating source, and a time period within which the IP address is assigned to the originating source.

4. A method as recited in claim 1, wherein the filter request comprises one or more of a persistent attribute of the second customer, and a time period for which the filter request needs to be imposed.

5. A method as recited in claim 1, further comprising relaying the filter request through one or more ASs in the network.

6. A method as recited in claim 1, wherein the network includes accountable ASs and unaccountable ASs, the accountable ASs comprising ASs that implement ingress filtering on data packets and conduct on-request filtering within the network, the method further comprising:
   designating data packets differently according to whether (1) the data packets originated from within an accountable AS and are relayed exclusively through one or more accountable ASs, or (2) the data packets originated from within an unaccountable AS or otherwise are relayed through at least one unaccountable AS.

7. A method as recited in claim 1, further comprising:
   for each data packet, determining whether the data packet contains at least one accountability bit, the accountability bit indicating whether the data packet originated from a known and trusted originating source; and
   handling the data packets differently depending upon the determination.

8. A method as recited in claim 1, further comprising preserving an accountability bit in a data packet when replying to an originating source of the data packet, the accountability bit indicating whether the originating source of the data packet is a known and trusted originating source.

9. A method as recited in claim 1, further comprising determining whether an AS is implementing ingress filtering.

10. A method as recited in claim 1, further comprising determining whether an AS is conducting on-request filtering.

11. A method as recited in claim 1, wherein the first AS is the same as the second AS.

12. A method as recited in claim 1, further comprising charging the first customer a fee on a basis of a number of filter requests the first customer makes, wherein the fee is shared among the first and second ASs.

13. A method as recited in claim 1, the method further comprising:
   upon determining that the first customer has exceeded a threshold on the number of filter requests the first customer is allowed to make or a limit on the rate at which the first customer is allowed to send the filter requests, ignoring any further filter request made from the first customer.

14. A computing device comprising:
   memory;
   one or more processors operatively coupled to the memory;
   an on-request filter, stored in the memory and executed on the one or more processors that is configured to:
      filter data packets originating from an offending customer in response to one or more filter requests made by one or more requesting customers to filter data packets sent from the offending customer to the one or more requesting customers,
      ignore the one or more filter requests that are made by the one or more requesting customers to filter the data packets sent from the offending customer to the one or more requesting customers when the rate at which the one or more filter requests are applied on the offending customer exceeds a set limit; and
   a packet evaluator stored in the memory and executed on the one or more processors that is configured to:
      determine whether a data packet includes an accountability bit, and
      handle the data packet differently depending upon the determination, the accountability bit indicating whether the data packet originated from a known and trusted originating source.

15. A computing device as recited in claim 14, wherein the on-request filter is further configured to:
- log a destination address of a new data packet sent from the offending customer in response to receiving a dispute with the one or more filter requests from the offending customer,
- determine whether a new filter request is made by a customer that correspond to the logged destination address, and
- ignore the new filter request in response to determining that the new filter request is made by a customer that does not correspond to the logged destination address.

16. A computing device as recited in claim 14, wherein the on-request filter is further configured to allow the offending customer to dispute with the one or more filter requests that are made by the one or more requesting customers to filter the data packets sent from the offending customer to the one or more requesting customers.

17. A system comprising:
- one or more devices to implement ingress filtering on data packets;
- one or more customers, each of the one or more customers preserving an accountability bit in a data packet when replying back to an originating source of the data packet, the accountability bit indicating whether an originating source of the data packet is a known and trusted originating source; and
- a Filter Request Server (FRS) configured to:
- conduct on-request filtering,
- receive a filter request made by a first customer for filtering future data packets sent from a second customer,
- determine whether to install an on-request filter for filtering the future data packets sent from the second customer to the first customer or to ignore the filter request made by the first customer; and
- install the on-request filter or ignore the filter request based on the determination.

18. A system as recited in claim 17, wherein the one or more devices are further configured to perform one or more acts comprising:
- determining whether a data packet of the data packets that is implemented ingress filtering includes at least one accountability bit;
- handling the determined data packet differently depending upon whether the determined data packet includes at least one accountability bit; and
- setting an accountability bit in the determined data packet.

19. A system as recited in claim 17, wherein the FRS is further configured to:
- log one or more destination addresses of data packets that have been sent from the second customer,
- determine whether the first customer corresponds to one of the one or more logged destination addresses of the data packets that have been sent from the second customer, and
- ignore the filter request made by the first customer in response to determining that the first customer does not correspond to one of the one or more logged destination addresses of the data packets that have been sent from the second customer.

20. A system as recited in claim 17, wherein the FRS is further configured to:
- log one or more destination addresses of data packets that have been sent from the second customer,
- determine whether the first customer corresponds to one of the one or more logged destination addresses of the data packets that have been sent from the second customer, and
- install the on-request filter for filtering the future data packets sent from the second customer to the first customer in response to determining that the first customer corresponds to one of the one or more logged destination addresses of the data packets that have been sent from the second customer.

* * * * *